(12) United States Patent
McCurnin et al.

(10) Patent No.: US 9,691,076 B2
(45) Date of Patent: Jun. 27, 2017

(54) DEMAND RESPONSE SYSTEM HAVING A PARTICIPATION PREDICTOR

(71) Applicant: Honeywell International Inc., Morristown, NJ (US)

(72) Inventors: David J. McCurnin, Coon Rapids, MN (US); Nicholas Dalsin, Minneapolis, MN (US); Seth Rourke, Lakeville, MN (US); Edward Koch, San Rafael, CA (US)

(73) Assignee: Honeywell International Inc., Morris Plains, NJ (US)

( * ) Notice: Subject to any disclaimer, the term of this patent is extended or adjusted under 35 U.S.C. 154(b) by 65 days.

(21) Appl. No.: 14/598,627

(22) Filed: Jan. 16, 2015

(65) Prior Publication Data
US 2015/0170171 A1    Jun. 18, 2015

Related U.S. Application Data

(63) Continuation-in-part of application No. 13/939,935, filed on Jul. 11, 2013.

(51) Int. Cl.
  *G06Q 50/06* (2012.01)
  *G05B 11/01* (2006.01)
  (Continued)

(52) U.S. Cl.
  CPC ........... *G06Q 30/0202* (2013.01); *G06N 5/04* (2013.01); *G06Q 10/0631* (2013.01);
  (Continued)

(58) Field of Classification Search
  CPC ...... G06Q 50/06; G06Q 10/063; G06Q 10/06; G06Q 30/0244
  (Continued)

(56) References Cited

U.S. PATENT DOCUMENTS 4,110,827 A    8/1978   Shavit
4,130,874 A    12/1978  Pai
(Continued)

FOREIGN PATENT DOCUMENTS

EP      2456227       5/2012
JP      2012118982    6/2012
(Continued)

OTHER PUBLICATIONS

Sheu (Transportation Research Part E: Logistics and Transportation Review, vol. 42, Issue 6, pp. 445-472 Nov. 2006).*

(Continued)

*Primary Examiner* — Ivan R Goldberg
*Assistant Examiner* — Matthew D Henry
(74) *Attorney, Agent, or Firm* — Seager, Tufte & Wickhem, LLP

(57) ABSTRACT

A demand response management system having a participation predictor. There may be a storage device having information collected about past behavior, related to participation in a demand response program, about a customer. The information may incorporate determining a period of time since the customer last participated in a demand response program, a frequency of participation in demand response events by the customer, and a size of energy loads of the customer. A model of the customer may be developed from this and other information. A processor may be used to collect and process the information, develop a model, and to make a prediction of a customer's being selected to participate in an event based on the various operator selectable criteria.

8 Claims, 9 Drawing Sheets

(51) Int. Cl.
*G06N 5/04* (2006.01)
*G06Q 30/02* (2012.01)
*G06Q 10/06* (2012.01)

(52) U.S. Cl.
CPC .......... *G06Q 50/06* (2013.01); *Y02B 60/1278* (2013.01); *Y02B 60/1282* (2013.01); *Y02B 70/3225* (2013.01); *Y04S 10/54* (2013.01); *Y04S 20/222* (2013.01)

(58) Field of Classification Search
USPC ....................................................... 705/7.31
See application file for complete search history.

(56) References Cited

U.S. PATENT DOCUMENTS

| | | | |
|---|---|---|---|
| 4,153,936 A | 5/1979 | Schmitz et al. | |
| 4,419,667 A | 12/1983 | Gurr et al. | |
| 4,850,010 A | 7/1989 | Stanbury et al. | |
| 4,937,760 A | 6/1990 | Beitel et al. | |
| 5,319,781 A * | 6/1994 | Syswerda | G06N 3/126 |
| | | | 705/7.25 |
| 5,341,142 A | 8/1994 | Reis et al. | |
| 5,500,561 A | 3/1996 | Wilhelm | |
| 5,566,084 A | 10/1996 | Cmar | |
| 5,572,438 A | 11/1996 | Ehlers et al. | |
| 5,598,349 A | 1/1997 | Elliason et al. | |
| 5,719,854 A | 2/1998 | Choudhury et al. | |
| 5,822,553 A | 10/1998 | Gifford et al. | |
| 5,892,758 A | 4/1999 | Argyroudis | |
| 6,026,375 A | 2/2000 | Hall et al. | |
| 6,195,367 B1 | 2/2001 | Jakobik et al. | |
| 6,209,018 B1 | 3/2001 | Ben-Shachar et al. | |
| 6,252,950 B1 | 6/2001 | Duty et al. | |
| 6,259,723 B1 | 7/2001 | Miyashita | |
| 6,278,717 B1 | 8/2001 | Arsenault et al. | |
| 6,289,384 B1 | 9/2001 | Whipple et al. | |
| 6,366,926 B1 | 4/2002 | Pohlmann et al. | |
| 6,446,136 B1 | 9/2002 | Pohlmann et al. | |
| 6,519,509 B1 | 2/2003 | Nierlich et al. | |
| 6,529,723 B1 | 3/2003 | Bentley | |
| 6,535,817 B1 | 3/2003 | Krishnamurti et al. | |
| 6,566,926 B1 | 5/2003 | Patterson | |
| 6,574,581 B1 | 6/2003 | Bohrer et al. | |
| 6,758,161 B2 | 7/2004 | Nohynek | |
| 6,832,249 B2 | 12/2004 | Yeager et al. | |
| 6,857,022 B1 | 2/2005 | Scanlan | |
| 6,865,685 B2 | 3/2005 | Hammond et al. | |
| 6,985,087 B2 | 1/2006 | Soliman | |
| 7,010,700 B1 | 3/2006 | Foss et al. | |
| 7,016,784 B2 | 3/2006 | Allen et al. | |
| 7,039,532 B2 | 5/2006 | Hunter | |
| 7,069,309 B1 | 6/2006 | Dodrill et al. | |
| 7,183,910 B2 | 2/2007 | Alvarez et al. | |
| 7,260,616 B1 | 8/2007 | Cook | |
| 7,333,880 B2 | 2/2008 | Brewster et al. | |
| 7,337,237 B2 | 2/2008 | Salahshoor et al. | |
| 7,346,467 B2 | 3/2008 | Bohrer et al. | |
| 7,392,115 B2 | 6/2008 | Schindler | |
| 7,401,086 B2 | 7/2008 | Chorafakis et al. | |
| 7,472,301 B2 | 12/2008 | Ginggen et al. | |
| 7,528,503 B2 | 5/2009 | Rognli et al. | |
| 7,565,227 B2 | 7/2009 | Richard et al. | |
| 7,590,746 B2 | 9/2009 | Slater et al. | |
| 7,650,289 B2 | 1/2010 | Cooper et al. | |
| 7,676,657 B2 | 3/2010 | Lindholm et al. | |
| 7,702,424 B2 | 4/2010 | Cannon et al. | |
| 7,715,951 B2 | 5/2010 | Forbes, Jr. et al. | |
| 7,742,953 B2 | 6/2010 | King et al. | |
| 7,775,191 B2 | 8/2010 | Hou | |
| 7,778,738 B2 | 8/2010 | Taft | |
| 7,797,009 B2 | 9/2010 | Kiiskila et al. | |
| 7,806,845 B2 | 10/2010 | Arm et al. | |
| 7,844,481 B2 | 11/2010 | Hilbush et al. | |
| 7,845,576 B2 | 12/2010 | Siddaramanna et al. | |
| 7,865,252 B2 | 1/2011 | Clayton | |
| 7,873,441 B2 | 1/2011 | Synesiou et al. | |
| 7,885,718 B2 | 2/2011 | Yano et al. | |
| 7,886,166 B2 | 2/2011 | Shnekendorf et al. | |
| 7,925,384 B2 | 4/2011 | Huizenga | |
| 7,941,528 B2 | 5/2011 | Hicks, III et al. | |
| 7,954,726 B2 | 6/2011 | Siddaramanna et al. | |
| 7,958,229 B2 | 6/2011 | Conway | |
| 8,023,410 B2 | 9/2011 | O'Neill | |
| 8,073,558 B2 | 12/2011 | Koch et al. | |
| 8,073,732 B1 * | 12/2011 | Ghosh | G06Q 30/00 |
| | | | 705/14.36 |
| 8,091,794 B2 | 1/2012 | Siddaramanna et al. | |
| 8,140,279 B2 | 3/2012 | Subbloie | |
| 8,140,658 B1 | 3/2012 | Gelvin et al. | |
| 8,143,811 B2 | 3/2012 | Shloush et al. | |
| 8,163,276 B2 | 4/2012 | Hedrick et al. | |
| 8,170,774 B2 | 5/2012 | Forte et al. | |
| 8,183,995 B2 | 5/2012 | Wang et al. | |
| 8,199,773 B2 | 6/2012 | Aubin et al. | |
| 8,232,745 B2 | 7/2012 | Chemel et al. | |
| 8,234,017 B2 | 7/2012 | Ahn | |
| 8,234,876 B2 | 8/2012 | Parsonnet et al. | |
| 8,260,468 B2 | 9/2012 | Ippolito et al. | |
| 8,260,469 B2 | 9/2012 | Gregory et al. | |
| 8,260,650 B2 | 9/2012 | Miller | |
| 8,291,243 B2 | 10/2012 | Castelli et al. | |
| 8,295,989 B2 | 10/2012 | Rettger et al. | |
| 8,305,380 B2 | 11/2012 | Gotwalt et al. | |
| 8,312,299 B2 | 11/2012 | Tremel et al. | |
| 8,321,302 B2 | 11/2012 | Bauer et al. | |
| 8,321,950 B2 | 11/2012 | Oran | |
| 8,327,024 B2 | 12/2012 | Pattison et al. | |
| 8,330,762 B2 | 12/2012 | Grossman | |
| 8,352,094 B2 | 1/2013 | Johnson et al. | |
| 8,373,547 B2 | 2/2013 | Benya et al. | |
| 8,386,086 B2 | 2/2013 | Roux et al. | |
| 8,406,937 B2 | 3/2013 | Verfuerth et al. | |
| 8,412,654 B2 | 4/2013 | Montalvo | |
| 8,417,391 B1 | 4/2013 | Rombouts et al. | |
| 8,443,355 B2 | 5/2013 | Wiese et al. | |
| 8,565,903 B2 | 10/2013 | Koch et al. | |
| 8,595,094 B1 | 11/2013 | Forbes, Jr. | |
| 8,621,097 B2 | 12/2013 | Venkatakrishnan et al. | |
| 8,626,354 B2 | 1/2014 | Walter et al. | |
| 8,630,744 B2 | 1/2014 | Walter et al. | |
| 8,639,214 B1 | 1/2014 | Fujisaki | |
| 8,676,273 B1 | 3/2014 | Fujisaki | |
| 8,676,953 B2 | 3/2014 | Koch | |
| 8,700,187 B2 | 4/2014 | Forbes, Jr. | |
| 8,782,190 B2 | 7/2014 | Koch | |
| 8,868,925 B2 | 10/2014 | Wyatt et al. | |
| 8,879,488 B2 | 11/2014 | Pavlovski et al. | |
| 9,183,522 B2 | 11/2015 | Koch | |
| 2003/0016237 A1 | 1/2003 | Hickey | |
| 2003/0033230 A1 | 2/2003 | Mccall | |
| 2003/0069752 A1 | 4/2003 | LeDain et al. | |
| 2003/0233064 A1 | 12/2003 | Arm et al. | |
| 2004/0034484 A1 | 2/2004 | Solomita, Jr. et al. | |
| 2004/0137897 A1 | 7/2004 | Teixeira | |
| 2004/0203649 A1 | 10/2004 | Cashiola | |
| 2005/0027636 A1 | 2/2005 | Gilbert et al. | |
| 2005/0152694 A1 | 7/2005 | Chown | |
| 2005/0172304 A1 | 8/2005 | Tavares et al. | |
| 2005/0194456 A1 | 9/2005 | Tessier et al. | |
| 2005/0229220 A1 | 10/2005 | Fisher et al. | |
| 2005/0262026 A1 | 11/2005 | Watkins | |
| 2007/0005195 A1 | 1/2007 | Pasquale et al. | |
| 2007/0055999 A1 | 3/2007 | Radom et al. | |
| 2007/0222295 A1 | 9/2007 | Wareham et al. | |
| 2008/0011864 A1 | 1/2008 | Tessier et al. | |
| 2008/0046715 A1 | 2/2008 | Balazs et al. | |
| 2008/0114638 A1 | 5/2008 | Colliau et al. | |
| 2008/0167931 A1 | 7/2008 | Gerstemeier et al. | |
| 2008/0177678 A1 | 7/2008 | Di Martini et al. | |
| 2008/0255760 A1 | 10/2008 | Rojicek et al. | |
| 2008/0262848 A1 | 10/2008 | Shienbrood et al. | |
| 2009/0046625 A1 | 2/2009 | Diener et al. | |
| 2009/0187499 A1 | 7/2009 | Mulder et al. | |

(56) References Cited

U.S. PATENT DOCUMENTS

| | | |
|---|---|---|
| 2009/0198384 A1 | 8/2009 | Ahn |
| 2009/0204977 A1 | 8/2009 | Tavares et al. |
| 2009/0249090 A1 | 10/2009 | Schmitz et al. |
| 2009/0271255 A1 | 10/2009 | Utter et al. |
| 2009/0281674 A1 | 11/2009 | Taft |
| 2009/0295594 A1 | 12/2009 | Yoon |
| 2009/0297488 A1 | 12/2009 | Fraser et al. |
| 2009/0313083 A1 | 12/2009 | Dillon et al. |
| 2009/0319090 A1 | 12/2009 | Dillon et al. |
| 2010/0057480 A1 | 3/2010 | Arfin et al. |
| 2010/0076615 A1 | 3/2010 | Daniel et al. |
| 2010/0076835 A1 | 3/2010 | Silverman |
| 2010/0106342 A1 | 4/2010 | Ko et al. |
| 2010/0106543 A1 | 4/2010 | Marti |
| 2010/0114340 A1 | 5/2010 | Huizenga et al. |
| 2010/0138363 A1 | 6/2010 | Batterberry et al. |
| 2010/0168924 A1 | 7/2010 | Tessier et al. |
| 2010/0274377 A1 | 10/2010 | Kaufman et al. |
| 2010/0283606 A1 | 11/2010 | Tsypin et al. |
| 2010/0324962 A1 | 12/2010 | Nesler et al. |
| 2010/0332275 A1* | 12/2010 | Walsh ............ G06Q 10/06 705/7.37 |
| 2011/0016200 A1 | 1/2011 | Koch |
| 2011/0040550 A1 | 2/2011 | Graber et al. |
| 2011/0040666 A1 | 2/2011 | Crabtree et al. |
| 2011/0046805 A1 | 2/2011 | Bedros et al. |
| 2011/0093493 A1 | 4/2011 | Nair et al. |
| 2011/0113068 A1 | 5/2011 | Ouyang |
| 2011/0125542 A1* | 5/2011 | Koch ............ G06F 17/30976 705/7.16 |
| 2011/0172836 A1 | 7/2011 | Boss et al. |
| 2011/0172838 A1 | 7/2011 | Pai et al. |
| 2011/0196539 A1 | 8/2011 | Nair et al. |
| 2011/0196546 A1 | 8/2011 | Muller et al. |
| 2011/0199209 A1 | 8/2011 | Siddaramanna et al. |
| 2011/0212700 A1 | 9/2011 | Petite |
| 2011/0231320 A1 | 9/2011 | Irving |
| 2011/0258049 A1 | 10/2011 | Ramer et al. |
| 2011/0301774 A1 | 12/2011 | Koch |
| 2012/0066397 A1 | 3/2012 | Koch et al. |
| 2012/0066686 A1 | 3/2012 | Koch |
| 2012/0084696 A1 | 4/2012 | Marti |
| 2012/0093141 A1 | 4/2012 | Imes et al. |
| 2012/0101653 A1 | 4/2012 | Tran |
| 2012/0109399 A1 | 5/2012 | Tran |
| 2012/0136915 A1 | 5/2012 | Koch et al. |
| 2012/0166380 A1* | 6/2012 | Sridharan ............ G06Q 30/02 706/52 |
| 2012/0173030 A1 | 7/2012 | Taft |
| 2012/0197456 A1* | 8/2012 | Walter ............ G06Q 50/06 700/297 |
| 2012/0197457 A1 | 8/2012 | Walter et al. |
| 2012/0197458 A1 | 8/2012 | Walter et al. |
| 2012/0245968 A1 | 9/2012 | Beaulieu et al. |
| 2012/0271473 A1 | 10/2012 | Koch |
| 2012/0277920 A1 | 11/2012 | Koch |
| 2012/0310431 A1* | 12/2012 | Cheetham ............ G06Q 50/06 700/295 |
| 2013/0035992 A1 | 2/2013 | Silverman |
| 2013/0047010 A1 | 2/2013 | Massey et al. |
| 2013/0079931 A1 | 3/2013 | Wanchoo et al. |
| 2013/0110970 A1* | 5/2013 | Meyerhofer ........ G06Q 50/06 709/217 |
| 2013/0123996 A1 | 5/2013 | Matos |
| 2013/0144451 A1 | 6/2013 | Kumar et al. |
| 2013/0173243 A1 | 7/2013 | Kayton et al. |
| 2013/0254151 A1* | 9/2013 | Mohagheghi ...... G06Q 30/0621 706/46 |
| 2013/0345884 A1* | 12/2013 | Forbes, Jr. ............ G05B 15/02 700/286 |
| 2014/0081704 A1 | 3/2014 | Strelec et al. |
| 2014/0122181 A1 | 5/2014 | Fisera et al. |
| 2014/0149973 A1 | 5/2014 | Walter et al. |
| 2014/0277769 A1* | 9/2014 | Matsuoka ............ G06Q 50/06 700/278 |
| 2014/0277795 A1 | 9/2014 | Matsuoka et al. |
| 2014/0278687 A1* | 9/2014 | McConky ........ G06Q 10/06312 705/7.22 |
| 2015/0018985 A1 | 1/2015 | Koch et al. |
| 2015/0019032 A1 | 1/2015 | Koch et al. |
| 2015/0019037 A1 | 1/2015 | Koch |
| 2015/0019275 A1 | 1/2015 | Koch |
| 2015/0112500 A1 | 4/2015 | Koch |
| 2015/0134280 A1 | 5/2015 | Narayan et al. |
| 2015/0277400 A1 | 10/2015 | Koch |
| 2016/0266181 A1* | 9/2016 | Kawaguchi .......... G01R 21/133 |

FOREIGN PATENT DOCUMENTS

| | | |
|---|---|---|
| WO | WO 2005/033964 | 4/2005 |
| WO | WO 2008/027455 | 3/2008 |
| WO | WO 2008/027457 | 3/2008 |
| WO | WO 2009/006133 | 1/2009 |
| WO | WO 2009/020606 | 2/2009 |
| WO | WO 2009/023230 | 2/2009 |
| WO | WO 2009/027617 | 3/2009 |
| WO | WO 2009/085610 | 7/2009 |
| WO | WO 2011/008775 | 1/2011 |
| WO | WO 2011/065007 | 6/2011 |
| WO | WO 2013/025565 | 2/2013 |
| WO | WO 2013/055551 | 4/2013 |
| WO | WO 2014/036408 | 3/2014 |

OTHER PUBLICATIONS

Couper, "Optimizing Demand Response to Improve Economic Dispatch and Reliability," downloaded from http://public.dhe.ibm.com/common/ssi/ecm/en/euw03026usen/EUW03026USEN.PDF, 5 pages, prior to Dec. 11, 2013.

"Executive Summary," 1 page, prior to Sep. 2007.

"Smart Demand Response: A Discussion Paper," Energy Networks Association, energyuk, 44 pages, prior to Nov. 29, 2012.

Abdullah et al., "Demand-Side Energy Management Performed Using Direct Feedback via Mobile Systems: Enables Utilities to Deploy Consumer Based Demand Response Programs," 2010 IEEE International Energy Conference and Exhibition, pp. 172-177, 2010.

Autogrid, "Austin Energy and AutoGrid Systems Collaborate on Standards-Based Automated Demand Response to Usher in a New Era of Retail Choice for the Demand Response Market," 5 pages, Feb. 26, 2013.

Combined Search and Examination Report Under Sections 17 and 18(3) for Corresponding UK Patent Application Serial No. GB1504192.4 dated Sep. 8, 2015.

European Search Report for Related Application No. EP 12169650.4, Dated Nov. 22, 2012.

International Search Report for PCT Application Serial No. pct/us2012/058537, International Filing Date Oct. 3, 2012.

U.S. Appl. No. 14/526,193, filed Oct. 28, 2014.

Coughlin et al., "Estimating Demand Response Load Impacts: Evaluation of Baseline Load Models for Non-Residential Buildings in California," Lawrence Berkeley National Laboratory, Report No. LBNL-63728, 33 pages, Jan. 2008.

Cruz, "Tutorial on GPU Computing with an Introduction to CUDA," 37 pages, prior to Nov. 17, 2011.

Federal Energy Regulatory Commission (FERC), "Assessment of Demand Response & Advanced Metering," 92 pages, Sep. 2007.

Holmberg, "Facility Interface to the Smart Grid," National Institute of Standards and Technology, 7 pages, printed 2012.

Honeywell, "Automated Demand Response—Southern California Program," 2 pages, printed Aug. 1, 2011.

Honeywell, "The Perfect Response to Peak Events," 4 pages, Nov. 2010.

http://en.wikipedia.org/wiki/Demand_response, "Demand Response," 10 pages, printed Feb. 3, 2012.

http://www.akuacom.com/solutions/index.html, "Akuacom—Automated Demand Response," 2 pages, printed Feb. 3, 2012.

(56) References Cited

OTHER PUBLICATIONS http://www.naesb.org/pdf3/dsmee012308213.doc, "Demand Response Measurement and Verification Literature Review," 29 pages, created Jan. 14, 2008, modified Dec. 18, 2012.
https://buildingsolutions.honeywell.com/Cultures/en-US/Markets/Utilities/DemandResponse/, 1 page, printed Feb. 3, 2012.
Hunt, "Automated Demand Response System and Advanced End-Use Services Platform," Optimal Technologies, 31, pages, Sep. 24, 2004.
Kiliccote et al., "Findings from Seven Years of Field Performance Data for Automated Demand Response in Commercial Buildings," Lawrence Berkeley National Laboratory, Report No. LBNL-3643E, May 2010.
Kiliccote et al., "Open Automated Demand Response Communications in Demand Response for Wholesale Ancillary Services," Lawrence Berkeley National Laboratory, Report No. LBNL-2945E, 13 pages, Nov. 2009.
Kiliccote et al., "Open Automated Demand Response for Small Commercial Buildings," Lawrence Berkeley National Laboratory, Report No. LBNL-2195E, 104 pages, Jul. 2009.
Koch et al., "Architecture Concepts and Technical Issues for an Open, Interoperable Automated Demand Response Infrastructure," Berkeley National Laboratory, Report No. LBNL-63664, 7 pages, Oct. 2007.
Koch et al., "Direct Versus Facility Centric Load Control for Automated Demand Response," Lawrence Berkeley National Laboratory, Report No. LBNL-2905E, 11 pages, Nov. 2009.
Koch et al., "Scenarios for Consuming Standardized Automated Demand Response Signals," Lawrence Berkeley National Laboratory, Report No. LBNL-1362E, 10 pages, Nov. 2008.
Koch, "The Demand Response Automation Server (DRAS)," Building Performance, http://www.akuacom.com/assets/pdf/ASHRAE_2008_Ed_Koch.pdf, 18 pages, prior to Nov. 17, 2011.
Olson, "New Approaches in Automating and Optimizing Demand Response to Solve Peak Load Management Problems," Building IQ brochure, 8 pages, 2011.
Piette et al., "Automated Critical Peak Pricing Field Tests: 2006 Pilot Program Description and Results," Berkeley National Laboratory, Report No. LBNL-62218, 67 pages, Aug. 2007.
Piette et al., "Automated Critical Peak Pricing Field Tests: Program Description and Results," Lawrence Berkeley National Laboratory, Report No. LBNL-59351, Apr. 2006.
Piette et al., "Design and Implementation of an Open, Interoperable Automated Demand Response Infrastructure," Berkeley National Laboratory, Report No. LBNL-63665, 6 pages, Oct. 2007.
Piette et al., "Findings From the 2004 Fully Automated Demand Response Tests in Large Facilities," Lawrence Berkeley National Laboratory, Report No. LBNL-58178, 197 pages, Sep. 2005.
Piette et al., "Linking Continuous Energy Management and Open Automated Demand Response," Lawrence Berkeley National Laboratory, Report No. LBNL-1361E, 9 pages, Nov. 2008.
Piette et al., "Open Automated Demand Response Communications Specification," Version 1.0, CEC-500-2009-063, 214 pages, Apr. 2009.
Piette et al., "Participation through Automation: Fully Automated Critical Peak Pricing in Commercial Buildings," Berkeley National Laboratory, Report No. LBNL-60614, 14 pages, Aug. 13-18, 2006.
Santacana et al., "Getting Smart, With a Clearer Vision of Intelligent Grid, Control Emerges from Chaos," IEEE Power and Energy Magazine, pp. 41-48, Mar./Apr. 2010.
Schisler et al., "The Role of Demand Response in Ancillary Services Markets," IEEE, 3 pages, 2008.
Violette et al., "DRR Valuation and Market Analysis vol. II: Assessing the DRR Benefits and Costs," Summit Blue Consulting, 112 pages, Jan. 6, 2006.
Watson et al., "Machine to Machine (M2M) Technology in Demand Responsive Commercial Buildings," Berkeley National Laboratory, Report No. LBNL-55087, 18 pages, Aug. 2004.
Yin et al., "Auto-DR and Pre-Cooling of Buildings at Tri-City Corporate Center," Lawrence Berkeley National Laboratory, Report No. LBNL-3348, 140 pages, Nov. 2008.
Zaidi et al., "Load Recognition for Automated Demand Response in Microgrids," IEEE, pp. 2436-2439, 2010.

\* cited by examiner

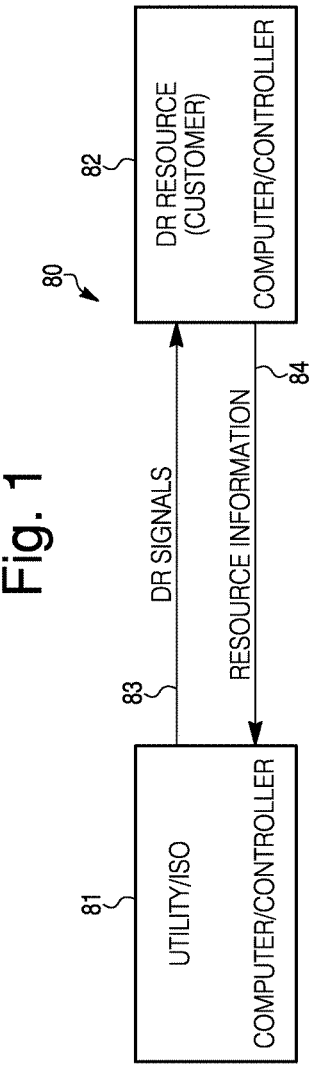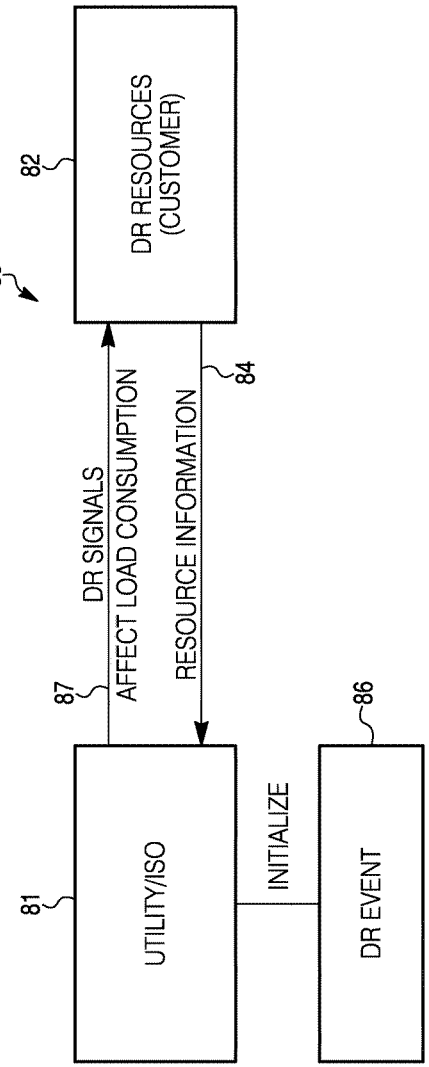

(i) Weeks in Review Period    24
(j) Review Period Last Date   20-Jun

| ID# | Customer name | Date of last DR in 24 weeks | Tot. DR Events in 24 weeks | Total Load (L) in 24 weeks | Recency (# Days) | DR per week # | Load per Event | Load per Week |
|---|---|---|---|---|---|---|---|---|
| | (a) | (b) | (c) | (d) | (e) =j-b | (f) =c/i | (g) =d/c | (h) =d/i |
| 101 | David | 20-Jun | 3 | 4 | 0 | 0.13 | 1.33 | 0.17 |
| 102 | Sally | 1-Jun | 5 | 5 | 19 | 0.21 | 1.00 | 0.21 |
| 103 | Travis | 29-May | 8 | 10 | 22 | 0.33 | 1.25 | 0.42 |
| 104 | Sharon | 15-Jun | 10 | 12 | 5 | 0.42 | 1.20 | 0.50 |
| 105 | Reagan | 14-Jun | 12 | 16 | 6 | 0.50 | 1.33 | 0.67 |
| 106 | Stacey | 5-Feb | 20 | 22 | 135 | 0.83 | 1.10 | 0.92 |
| 107 | Murphy | 17-Mar | 13 | 12 | 95 | 0.54 | 0.92 | 0.50 |
| 108 | Hunter | 19-May | 6 | 5 | 32 | 0.25 | 0.83 | 0.21 |
| 109 | Tom | 17-Jun | 4 | 8 | 3 | 0.17 | 2.00 | 0.33 |
| 110 | Tip | 9-Apr | 9 | 10 | 72 | 0.38 | 1.11 | 0.42 |

Fig. 6

| | | | | | | | | | | | | | |
|---|---|---|---|---|---|---|---|---|---|---|---|---|---|
| (a) | (b) | (c) | | (d) | (e) | (f) | | (g) | (h) | (i) | | (j) | (k) | (l) |
| Sorted by Recency | | | | Sorted by Frequency | | | | Sorted by Load | | | | | Customer | Segment |
| 1 | 101 | David | R1 | 1 | 106 | Stacey | F1 | 1 | 106 | Stacey | L1 | 101 | David | R1 F2 L2 |
| 2 | 109 | Tom | R1 | 2 | 107 | Murphy | F1 | 2 | 105 | Reagan | L1 | 102 | Sally | R2 F2 L2 |
| 3 | 104 | Sharon | R1 | 3 | 105 | Reagan | F1 | 3 | 107 | Murphy | L1 | 103 | Travis | R2 F2 L1 |
| 4 | 105 | Reagan | R1 | 4 | 104 | Sharon | F1 | 4 | 104 | Sharon | L1 | 104 | Sharon | R1 F1 L1 |
| 5 | 102 | Sally | R2 | 5 | 110 | Tip | F1 | 5 | 110 | Tip | L1 | 105 | Reagan | R1 F1 L1 |
| 6 | 103 | Travis | R2 | 6 | 103 | Travis | F2 | 6 | 103 | Travis | L2 | 106 | Stacey | R2 F1 L1 |
| 7 | 108 | Hunter | R2 | 7 | 108 | Hunter | F2 | 7 | 109 | Tom | L2 | 107 | Murphy | R2 F1 L1 |
| 8 | 110 | Tip | R2 | 8 | 102 | Sally | F2 | 8 | 108 | Hunter | L2 | 108 | Hunter | R2 F1 L1 |
| 9 | 107 | Murphy | R2 | 9 | 109 | Tom | F2 | 9 | 102 | Sally | L2 | 109 | Tom | R1 F2 L2 |
| 10 | 106 | Stacey | R2 | 10 | 101 | David | F2 | 10 | 101 | David | L2 | 110 | Tip | R2 F2 L2 |

| RFS 41 | 80/20 42 | Top 80%=1 Bottom 20%=2 43 (a) | 44 (b) | 45 (c) | (m) 46 (d) | 24 47 (e)=c/a/m | 55 Weeks 48 (f)=h/c | 49 (g) | 50 (h) | 51 | 52 | 53 | 54 |
|---|---|---|---|---|---|---|---|---|---|---|---|---|---|
| | | Cell Description | # Cust in Cell | # New Customers | Tot. DR Events in 24 Weeks | Recency | Frequency | Load Per Dr Event | Load Per Dr Event Per Week | 24 Week Total Load | % of Customers | % of New Customers | % of DR Events | % of Load |
| | | | | | | # Days | DR Events PW | | | | | | | |
| 1 | | R1 F1 L1 | 264 | 26 | 1980.00 | 101.322 | 7.50 | 0.16 | 29.49 | 312.50 | 53% | 5% | 64% | 65% |
| 2 | | R1 F1 L2 | 63 | 8 | 456.00 | 107.7302 | 7.24 | 0.02 | 5.21 | 9.90 | 13% | 2% | 15% | 2% |
| 3 | | R1 F2 L1 | 63 | 6 | 61.00 | 97.96825 | 0.97 | 1.18 | 13.09 | 72.00 | 13% | 1% | 2% | 15% |
| 4 | | R1 F2 L2 | 10 | 32 | 8.00 | 78.2 | 0.80 | 0.16 | 3.23 | 1.30 | 2% | 6% | 0% | 0% |
| 5 | | R2 F1 L1 | 50 | 5 | 393.00 | 16.34 | 7.86 | 0.14 | 19.98 | 53.30 | 10% | 1% | 13% | 11% |
| 6 | | R2 F1 L2 | 23 | 3 | 171.00 | 15.13043 | 7.43 | 0.02 | 4.94 | 3.80 | 5% | 1% | 6% | 1% |
| 7 | | R2 F2 L1 | 23 | 6 | 25.00 | 16.56522 | 1.09 | 1.22 | 12.57 | 30.50 | 5% | 1% | 1% | 6% |
| 8 | | R2 F2 L2 | 4 | 75 | 5.00 | 23.5 | 1.25 | 0.16 | 2.38 | 0.80 | 1% | 15% | 0% | 0% |
| | Totals | | 500 | | 3099 | | | 3.06021231 | | 484.1 | | | | |

Fig. 9

| RFS | 80/20 Top 80%=1 Bottom 20%=2 | Cell Description | # Cust in Cell (a) | # New Customers (b) | Tot. DR Events in 24 Weeks (c) | Recency # Days (d) (m) | Frequency DR Events PW (e)=c/a/m | Load Per Dr Event (f)=h/c | Load Per Dr Event Per Week (g) | 24 Week Total Load (h) | % of Customers | % of New Customers | % of DR Events | % of Load |
|---|---|---|---|---|---|---|---|---|---|---|---|---|---|---|
| Guaranteed | | No Opt-Out | 2 | 0 | 0 | 0 | 0 | | | | | | | |
| 1 | | R1 F1 L1 | 262 | 26 | 1980.00 | 101.322 | 7.50 | 0.16 | 29.49 | 312.50 | 53% | 5% | 64% | 65% |
| 2 | | R1 F1 L2 | 63 | 8 | 456.00 | 107.7302 | 7.24 | 0.02 | 5.21 | 9.90 | 13% | 2% | 15% | 2% |
| 3 | | R1 F2 L1 | 63 | 6 | 61.00 | 97.96825 | 0.97 | 1.18 | 13.09 | 72.00 | 13% | 1% | 2% | 15% |
| 4 | | R1 F2 L2 | 10 | 32 | 8.00 | 78.2 | 0.80 | 0.16 | 3.23 | 1.30 | 2% | 6% | 0% | 0% |
| 5 | | R2 F1 L1 | 50 | 5 | 393.00 | 16.34 | 7.86 | 0.14 | 19.98 | 53.30 | 10% | 1% | 13% | 11% |
| 6 | | R2 F1 L2 | 23 | 3 | 171.00 | 15.13043 | 7.43 | 0.02 | 4.94 | 3.80 | 5% | 1% | 6% | 1% |
| 7 | | R2 F2 L1 | 23 | 6 | 25.00 | 16.56522 | 1.09 | 1.22 | 12.57 | 30.50 | 5% | 1% | 1% | 6% |
| 8 | | R2 F2 L2 | 4 | 75 | 5.00 | 23.5 | 1.25 | 0.16 | 2.38 | 0.80 | 1% | 15% | 0% | 0% |
| | | Totals | 498 | | 3099 | | | 3.06021231 | | 484.1 | | | | |

Weeks: 24

DEMAND RESPONSE SYSTEM HAVING A PARTICIPATION PREDICTOR

This application is a continuation-in-part of U.S. application Ser. No. 13/939,935, filed Jul. 11, 2013, and entitled "Optimizing a Selection of Demand Response Resources" U.S. application Ser. No. 13/939,935, filed Jul. 11, 2013, is hereby incorporated by reference.

BACKGROUND

The present disclosure pertains to energy systems and particularly to demand response systems.

SUMMARY

The disclosure reveals a demand response management system having a participation predictor. There may be a storage device having information collected about past behavior, related to participation in a demand response program, about a customer. The information may incorporate determining a period of time since the customer last participated in a demand response program, a frequency of participation in demand response events by the customer, and a size of energy loads of the customer. A model of the customer may be developed from this and other information. A processor may be used to collect and process the information, develop a model, and to make a prediction of the customer's being selected to participate in an event based on the various operator selectable criteria.

BRIEF DESCRIPTION OF THE DRAWING

FIG. 1 is a diagram of a basic demand response system;

FIG. 2 is a diagram of a demand response management system showing a demand response event;

FIG. 4 is a diagram of a chart revealing various combinations of recency, frequency and load ratings;

FIG. 5 is a diagram of a table indicating the data that may be looked at in determining a predictability of future participation by a demand response customer;

FIG. 6 is a chart that sorts the customers according to the information in chart of FIG. 5 for providing a sample rating;

FIG. 7 is a diagram of a chart that reveals a sample rating with a larger group of customers than the sample rating in charts of FIGS. 5 and 6, respectively;

FIG. 9 is a diagram of a chart that appears similar to the chart of FIG. 7 but having a category added for customers that are guaranteed to participate.

DESCRIPTION

Figure 3:
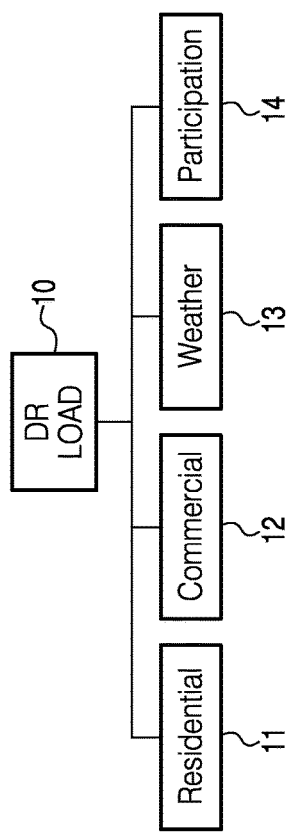
FIG. 3 is a diagram of various aspects that may affect a demand response load.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

An effective resource is especially critical when communities are confronted with a scarcity of a resource in question. It may be noted that "resource" is a term that may have several senses or meanings. "Resource" may refer to energy, commodity, product, load, and so on. In another sense or meaning, "resource" such as a demand response (DR) resource may refer to a customer, a user, facility, and so on. In the first mentioned sense, it may refer to electricity, water, gas and natural resources such as oil. A definition of resource may be extended to include such things such as water quality and air quality. After all, adequate water quality and air quality appear necessary to support a self-sustaining environment.

Resource management, in both senses of "resource", may be necessary so that systems can optimize the use of a limited resource. Currently, there are various systems for managing resources in various environments such as buildings, apartments, industrial facilities, and computing systems.

One mechanism that may be used to encourage customers to reduce demand and thereby reduce the peak demand for electricity may be referred to as demand response (DR). DR may refer to management of the demand by customers in response to supply conditions. For example, electricity customers may reduce their consumption at critical times and/or costs in response to market prices. These customers may be regarded as DR resources.

DR programs may require that a utility and/or independent service operator (ISO) deliver DR signals to participants via a communications channel. The programs may relate to a distribution of resources such as, but not limited to, electricity, water and natural gas.

DR signals may incorporate business level information, such as prices, reliability and shed levels. At some point, from the utility/ISO to loads in a facility, the business level information sent by the utility/ISO should be processed and used to execute a DR strategy and program for the facility.

DR programs may take many forms. They may differ from normal rates and tariffs in that the DR programs are designed to allow the utility/ISO take specific actions to influence the load profiles of facilities that participate in the DR programs at peak consumption times or periods on a grid. The peak consumption periods may cause critical grid reliability issues which should be addressed, but they may also trigger economic factors where the price of electricity or other power commodity reaches a critical level which may be ameliorated by reducing the overall consumption on the grid during those periods. The critical periods, in which the utility/ISO needs to influence a load profile of a facility, may be referred to as DR events.

A manner in which a utility/ISO may influence a load profile of a facility is to send out a DR signal which is specific to the DR event. DR signals may contain information related to business, controlling loads, and so on. There may be an automated DR where the DR signals that are sent out by the utility/ISO are responded to in an automated fashion. Loads within a facility may ultimately be affected by DR events via DR signals to which the facility acts upon or responds. The term "facility" may refer to virtually any location in which there are loads influenced by DR events. Where there are such loads may be regarded as a "DR resource". The term "utility" may be used in a general sense to refer to a utility, independent system operator, service provider, and the like. It may be appropriate to use the term "demand side resource" in order to define a demand response resource.

An implementation of DR signals within a "demand response management system" (DRMS) 80 is shown in a diagram of FIG. 1. System 80 and associated software may be effected and operated with one or more computers/controllers (controllers) 81, 82 and respective connections. The DRMS may be a system that is used by utilities/ISO's to manage the operation of DR programs. A focus of the DRMS may be on the operational aspects of managing the selection, signaling and monitoring of the DR resources that are participating in DR programs. The DRMS may be specifically designed to manage operations of automated DR programs.

There may be various types of interactions that could occur between the utility/ISO and a DR resource as part of a DR program. The diagram in FIG. 1 reveals an example interaction between a utility/ISO 81 and a DR resource (customer) 82. There may be DR signals 83 going from utility/ISO 81 to DR resource 82. There may be DR resource information 84, such as load measurements, going from DR resource 82 to utility/ISO 81.

Terms such as customer, client, user, participant, DR resource, and like terms, may be used, interchangeably or distinct from one another, depending on a context of a pertinent portion of a description or a claim.

A description of DR signals 83 may be noted. At a highest level, there may often be some sort of grid condition, be it economic or grid reliability in nature, which triggers a so-called DR event that requires some sort of interaction between the utility/ISO 81 and its customers 82. This interaction may eventually trigger some sort of load control taking place at a customer's facility. The interaction between the utility/ISO 81 and the customer 82 may be mediated by DR signals 83 and DR resource signals 84, i.e., information such as measurements. Signals 83 and 84 may represent communications between utility/ISO 81, and the DR resource or customer 82. Information contained within DR signals 83 may dictate where much of the decision-making takes place relative to, for example, in how the initial grid condition, which triggered the DR event, results in the eventual load control.

A computer or controller may incorporate one or more inputs, a processor, a user interface incorporating a keyboard, a display and a touch screen, a memory, external connections such as an internet, one or more outputs, and so forth. The computer may be utilized with virtually all items in and pertinent to FIGS. 1-9.

Automated demand response (ADR) programs may be used in a number of different customer market segments ranging from large commercial and industrial to small commercial and residential. A diagram of FIG. 2 shows a layout 85 of a utility/ISO 81 and DR resources 82. Utility/ISO 81 may enroll customers into demand response (DR) programs and model them as so called DR resources 82 that they can call upon when it is necessary for utility 81 to initiate a DR event 86. Calling upon a DR resource 82 typically means that the utility/ISO 81 "dispatches" the DR resources by sending them DR signals 87 which affect their load consumption in some predictable fashion. Information signals 84 may go from DR resources 82 to utility/ISO 81.

A pre-cursor to initiating a DR event 86 is the establishment of a set of objectives that need to be accomplished during the DR event. Such objectives may include the following items: 1) A specific amount of load response over some period of time (load responses may entail both reduced and increased levels of consumption); 2) Loads associated with a specific grid and/or geographic locations; 3) A specific type of loads; and 4) Loads with minimum response times and latencies.

When a utility 81 initiates a DR event 86, the utility may typically select some subset of the available DR resources 82 from the collection of all possible DR resources that meets the objectives as outlined above. Each DR resource 82 may have both capabilities and associated costs with using that resource during an event so the problem to be solved is how best to minimize the overall cost of a collection of DR resources while still using their capabilities to satisfy the overall objectives of the DR event 86. Furthermore, in the case of so called "Fast DR", which may require dispatches to happen in real time, it may be necessary that the DR resource 82 selection process be automated and not require human operator involvement.

The use of so called intermittent renewable resources (IRR) may become more prevalent as a source of electricity generation. IRR may incorporate such resources as solar and wind generation. Other resources may be incorporated. By their very nature, the output of such generation of resources may be strongly dependent upon weather conditions.

When the output of the IRR's varies, it may be necessary to change the output of other one or more generators and/or the amount of electricity consumed by demand response resources in order to keep the electric grid balanced. Such balancing responsibilities may be performed either by a centralized balancing authority such as an independent system operator (ISO) or may be done locally near the IRR itself so that the net output of the IRR is less variable from the perspective of other entities on the grid.

Weather forecasts may play a key role in the planned usage of IRR's, but accurately predicting the weather appears very difficult and short term, and unexpected fluctuations may still occur. During such short term unexpected weather events, it may be necessary to quickly bring to bear resources that can be used to balance the changes in the IRR output. This may be done by metering the power generated by the IRR and responding accordingly when it fluctuates from expected values. The present approach may further improve upon that methodology by using demand response resources that respond to weather conditions before the output of the IRR is actually affected thus giving the other DR resources more time to respond to the inevitable fluctuations in the IRR caused by weather conditions.

The use of demand response resources for a purpose described herein may be referred to as demand response (DR) and the automated use of such resources could be regarded as an automated demand response (ADR). In the case of ADR, there may exist some entity that calls upon a DR resource by sending it a so-called DR signal that causes the DR resource to automatically change its load consumption by either consuming less or more electricity, depending upon the information that is in the DR signal.

When it is necessary to utilize a DR resource, this necessity may be typically referred to as a DR event. The solution described herein may link the initiation of DR events to real-time weather conditions. Unlike the use of longer term weather forecasts to predict and plan the use of various resources to balance fluctuations in IRR output, the present approach solution may use real time weather conditions to trigger DR events. Furthermore, the solution may link specific DR resources to specific IRR's and the weather conditions at the IRR.

The present solution may rely upon ADR resources. This reliance may mean that the control of load consumption at the DR resources is automated such that when a DR event is initiated, a DR signal is sent to the DR resource which results in an automated change in the DR resources load consumption. This may allow for a very fast response by the DR resources.

Furthermore, the DR resource may be programmed to both increase and decrease its load consumption depending upon the nature of the fluctuation at the IRR.

The benefits of such an approach may include the following items: 1) Better able to handle unexpected fluctuations in the IRR by responding before the output of the IRR changes; 2) Ability to couple DR resources with specific IRR's such that the balancing activities can be performed by the IRR owner instead of a more centralized balancing authority such as an ISO; 3) Can be used to offset both increased and decreased output from the IRR.

The present disclosure may pertain to predicting participation in an opt-in/out demand response program. Demand response programs may often have opt-in or opt-out participation. One challenge may be to predict of a customer's being selected to participate in an event based on various operator selectable criteria. By using past behavior, one may begin by modeling a customer and its participation. This approach may be used to understand how many customers, such as people, groups or businesses, and so on, should be signaled to achieve the load necessary.

"RFL" may stand for recency, frequency and load relative to individuals that participate in a demand response (DR) program. A basis for using RFL for may be to provide a utility operator an ability to predict participation in a DR event. A view of a company may be created where an analysis of customers may take place.

The present approach may apply to smart phones, smart tablets, and other mobile devices, for managing switches, thermostats, pumps, fans, and heating/cooling elements.

DR for points program may be noted. As a person participates in a DR program, with each instance of DR the person may receive points. These points may be tracked on a smart phone app and web app. Other energy efficiency utility programs may be incorporated. To gain points, a person must opt-in. The person may opt-in automatically or be asked "would you like to earn 10 points for a DR event tomorrow?" The points may change and be controlled by a utility program manager.

There may be a DR opt in/out for cash/points in view a timer/limited supply. As a person participates in DR programs, with each instance of DR, the person may receive cash/points. The cash may be tracked on a smart phone app and a web app. Other energy efficiency utility programs may be included.

To gain points, a person may need to opt-in. The person may opt-in automatically or be asked, for instance, "would you like to earn $10 for a DR event tomorrow?" The points may change and be controlled by a utility program manager.

As time goes on, an amount of the reward may decrease. The amount may be controlled by the utility to create an incentive to the customer. The utility manager may increase or decrease the value based on time. By availability, the number of available rewards may be created and be given. The rewards may be based on a first come, first served instance. Customers may bid for the DR as a reverse auction. As a customer bids, then the utility may have the option to pick which the customer or customers it wants to accept.

A DR opt in/out may be based on a smart phone's location. When a person is at home, as indicated by a location of the person's phone, then the DR event may be set at another level. The level may be assumed by one of the following ways. Thermostat may be set to a setting that is consistent with someone being home, such as being asleep, awake, arriving, and so on. A smartphone may detect a GPS location and notify a "DR system" that the person is home. The person may be sent a signal who can confirm being at home. The person may have created a personal setting that either automatically accepts or denies the DR.

The DR event when a person is away, as indicated by a location of the person's phone, may be set at another level. The level may be set as a temperature setting or a control of an electrical load. For instance, a thermostat may be put at a setting that is consistent with someone being gone or away from home. A smartphone may detect a GPS location and notify the "DR system" that the person is away. The person may be sent a signal who can confirm as being away from home. The person may have created a personal setting that either automatically accepts or denies the DR.

A DR opt in/out may be based on a weather prediction. Based on weather conditions, a homeowner or business owner may be automatically asked to participate in a DR event. An acceptance may be on a smart phone. A weather condition may be something such as wind or sun that impacts a grid. For example, according to weather reports there may be a lot of cloud cover. The cloud cover may impact solar energy production and the utility would greatly appreciate the person's cooperation in participating in reducing energy consumption at these times. An example question and request to the person may be "Can you help? Please select YES or NO".

There may be an intelligent DR ramp rate. DR performed against a home may result in discomfort for a homeowner. Part of a challenge may be a recovery rate to regain a setpoint of the thermostat. For example, house #1 may be old and leaky. When a DR event is performed, this house may have its temperature changed +5 degrees to a new setpoint during a DR event. After the event, the time to reach the new setpoint may be 2 hours. House #2 may be a new home and built tightly. When a DR even is performed, this house may have its temperature changed by +5 degrees to a new setpoint during a DR event. After the event, the time to reach the new setpoint may be one hour.

DR events may be set to be customized to a home by understanding a setpoint recovery rate. By performing a test DR event and measuring the recovery to a setpoint, an algorithm may be created and a rating can be placed on a home. The rating may be used to apply a new methodology of DR by a utility. A utility operator may determine that the utility needs to get 1 kW of shed. The operator may select a temperature for off-set; however, the operator may also set the recovery timing for the home.

A utility operator may select +5 degrees for a setpoint and a recovery to setpoint of one hour (knowing that homeowners will want a normal planned temperature when they get home).

When applying the DR event, homes may be grouped by both temperature and recovery. Home #1 may only have a setback of 2.5 degrees because the recovery takes longer in this home. Home #2 may actually have a setback of 6 degrees because the recovery takes a shorter time in this home. Homeowners in both instances may be sent a message via text, email or phone or phone app. Message may state the time of the DR event, temp off-set and temperature anticipated recovery time.

An energy audit may be cued on a thermostat phone interface. Data from consumers' energy usage may be compared to data from external sources containing real estate information, such as house specifications. Homeowners or building owners may accept an energy audit suggestion and then perform an evaluation themselves.

The energy audit may incorporate the following activity. Average temperatures for each of the periods (sleep, wake, leave, arrive) of a residency may be recorded. The ramp rate for recovery to a set-point may be calculated. Recommendations for a new schedule based on recovery rate may be made. For instance, if one leaves at 7 AM for work then the thermostat may begin to quit cooling or heating prior to one's leaving because the home does not necessarily lose its temperature for a period of about 30 minutes after 7 AM. The temperature decline ramp rate of the home may be compared to other homes in the neighborhood based on age, recovery rate, sq. footage, number of people in the home, and so forth. A number of hours that the temperature schedule was overridden and the estimated cost/loss of savings may be shown.

DR opt in/out based on energy used to date or predicted to be used or of a budget may be noted. Owners may be notified based on energy usage targets. These targets may be either financial or based on kW/h. Customers' energy usage targets may be measured and measurements may be supplied to the customer via a letter, email, web or smart phone. This information may be compared to current energy usage. Customers may opt-in to volunteer their space for a DR event (whether one is planned or not). Volunteers may be gathered in a DRMS. An operator may make a decision on whether to perform a DR event based on a quantity of DR volunteers. DR volunteers may try to achieve their target energy usage by allowing the utility to take control. The volunteers may also avoid the need to change a schedule. A utility may calculate a known load opportunity and see the reserve on the market or find another use for the energy.

DR opt in/out based on multiple thermostats in a home/business/building/multiple buildings (grouping) may be noted. Open ADR may send one of four signals representing levels consisting of a normal setting, DR light, DR medium and DR heavy. Customers that are either homeowners or businesses may create schedules that are online for each one of the levels and do a level separately for each thermostat. Examples of schedules may incorporate a level one with 0 degrees for a dining space and 2 degrees for a kitchen, a level 2 with 0 degrees for the dining space and 3 degrees for the kitchen, and 1 degree for the dining space and 3 degrees for the kitchen.

A DR opt in/out may be based on fuel shortage (propane). A propane measurement and alerting system may be noted. Fuel levels for a source such as propane can be measured. There may be wireless communication of fuel (e.g., propane) levels via a thermostat or device to a smart phone. A sensor may be placed on a propane tank. The sensor measurement may be forwarded to a thermostat wirelessly that then communicates the measurement on the internet (via Wi-Fi or another wireless communication and to a gateway). The measurement or information may be sent to the thermostat portal and/or smartphone/tablet device. Alerts may be created based on levels of fuel left. An amount of fuel left may be derived from calculations based on current energy usage. Some of the factors may incorporate average energy usage over time, instant usage efficiency, and alerts based on pre-set levels or custom levels that can be set.

Many DR opt in/outs may be considered. There may be DR opt in/outs for water sprinklers and water heaters, and DR opt in/outs by levels. There may be DR opt in/outs for tune downs and pre-cool/heat options. There may be DR opt in/outs for excessive action (such as cooling, watering, and so on) involving a greater set-back. There may be a DR opt in/out learning capability via a smartphone.

The DR may turn off based on a mobile device location. DR levels may be opted-out based on a distance of a mobile phone from a home or business. The DR system may also learn based on information of a previous week. DR may read a calendar program that one is using.

DR may be used for hotel rooms in an unoccupied state. A DR opt in/out may be used with a gas generator for back-up. There may be an application of DR to a thermostat/switch based on a state of a schedule (e.g., unoccupied vs. occupied). DR may be used for a water heater via a smart phone app.

DR may be used for external control of water via a web/smart device (e.g., temp, temp setback, scheduling, first hour capacity, and/or other items). An algorithm may calculate recovery rate relative to external control. Wi-Fi may be a bridge/gateway to a water heater for DR.

As noted herein, DR prediction may be achieved using recency/frequency/load. There may be a mini-slit DR (i.e., virtually all ways of doing it). There may be a low frequency in a mini-split such as one way or two way kind.

DR may be used in review of pool pumps/public pumps. DR may be applied to a car such having an ability to dump a load into a battery or pre-cool/heat area.

There are several types of analytics that may be used for DR. The main purpose of many of these types may incorporate predicting an electrical grid or building/house load during a time of day, and predicting a shed of a building or home. This information may then be aggregated. An end result may be to make the life easier for a DR operator.

FIG. 3 is a diagram of various aspects that may affect a DR load 10. They may incorporate residential 11, commercial 12, weather 13 and participation 14. A focus of the present approach may be participation 14.

Figure 3A:
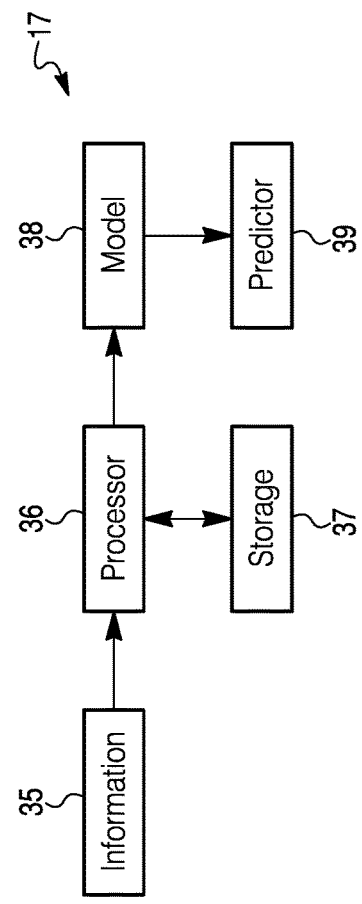
FIG. 3a is a diagram of a predictor mechanism.

FIG. 3a is a diagram of a mechanism 17 having information 35 entered into a storage 37 via a processor 36. Processor 36 may develop a model 38 from information 35. Processor 36 may also develop predicted behavior from model 38 with a predictor 39.

Definitions of some terms related to predictability of DR participation may be noted. "Recency" may be the number of days since someone last participated in DR. Customers may be partitioned into groups based on their recency rankings, e.g., either in group R1 or R2 where R1 may be a group with more recent participants. Partitioning of customers may incorporate more groups such as R1, R2, R3, . . . , Rn, where "n" may be any number.

"Frequency" may be a number of events that a person participated within a given period of time customers may be partitioned into groups based on their frequency of participation, e.g., groups F1 or F2 where customers in group F1 may have a greater number of frequent participation counts than those in group F2. Partitioning of customers may incorporate more groups such as F1, F2, F3, . . . , Fn, where "n" may be any number.

"Load" may be a size of the energy load of a person's home or business. The more load, the more energy that a utility operator may shed during a DR event. Customers may be partitioned into groups based on their load, e.g., L1 or L2 where customers in group L1 may have locations with larger energy loads than those of customers in group L2. Partitioning of customers may incorporate more groups such as L1, L2, L3, . . . , Ln, where "n" may be any number. FIG. 4 is a diagram of a chart 15 revealing eight various combinations of recency (R1 and R2), frequency (F1 and F2) and load (L1 and L2) groupings.

Other factors that may be considered are a number of DR opt outs left, a number of DR events participated in past, and a number that yet need to be participated in, by a person, group of persons, a business or other entity.

Figure 4A:
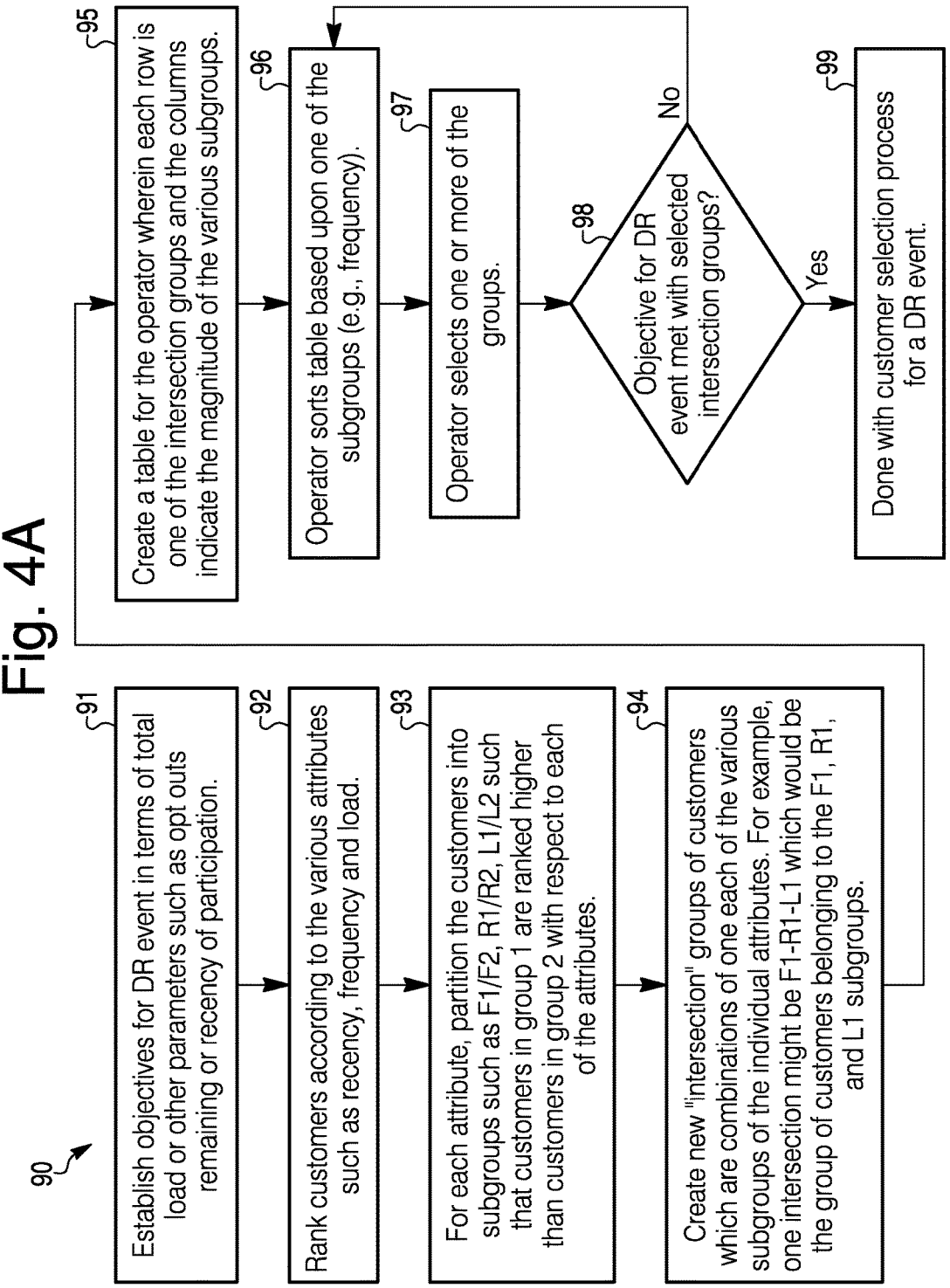
FIG. 4a is a diagram of a flow chart of a customer selection process for a demand response event.

FIG. 4a is a diagram of a flow chart 90 of a customer selection process for a DR event. Step 91 may be to establish objectives for DR event in terms of total load or other parameters such as opt outs remaining or recency of participation. Step 92 may be to rank customers according to the various attributes such as recency, frequency and load. Step 93 may be to, for each attribute, partition the customers into subgroups such as F1/F2, R1/R2, L1/L2 such that customers in group 1 are ranked higher than customers in group 2 with respect to each of the attributes. Step 94 may be to create new "intersection" groups of customers which are combinations of one each of the various subgroups of the individual attributes. For example, one intersection group might be F1-R1-L1 which would be the group of customers belonging to the F1, R1, and L1 subgroups. Step 95 may be to create a table for the operator wherein each row is one of the intersection groups and the columns indicate the magnitude of the various sub-groups. Step 96 may be for the operator to sort a table based upon one of the sub-groups (e.g., frequency). Step 97 may be for the operator to select one or more of the intersection groups. Step 98 may be a question of whether the objective for a DR event is met with selected intersection groups. If the answer is no, then steps 96-98 may be repeated. If the answer is yes, then the customer selection process may be done as indicated by step 99.

FIG. 5 is a diagram of a table 18 indicating the data that may be looked at in determining a predictability of future participation by a demand response customer. Column 21 lists ID numbers of customers subject to the data taking. Column 22 indicates the names of the customers. Column 23 is a date of a last DR in 24 weeks for each of the customers. Column 24 indicates a total DR event in 24 weeks. Column 25 indicates a total load (L) in 24 weeks. Column indicates recency in a number of days. Column 27 indicates a number of DRs per week. Column 28 indicates a load per event. Column 29 indicates the load per week. Columns 21, 22, 23, 24, 25, 26, 27, 28 and 29 have letter designations of (a), (b), (c), (d), (e), (f), (g) and (h), respectively. Other information in diagram 18 indicates a number of weeks (24) in a review period, which has a designation of (i), and a review period last date (17-June) which has a designation of (j). Total load may have a designation of (L). Recency 26 may be calculated as (j)-(b). DR per week 27 may be calculated as (c)/(i). Load per event 28 may be calculated as (d)/(c). Load per week 29 may be calculated as (d)/(L).

FIG. 6 is a chart 30 that sorts the customers according to the information in chart 18 of FIG. 5 for providing a sample ranking. In a group 31 of columns, the customers are sorted by recency; the lower number of days, the higher the ranking in the list. In a group 32 of columns, the customers are sorted by frequency; the higher number DRs per week, the higher the ranking in the list. In a group 33 of columns, the customers are sorted by load; the higher the load, the higher the ranking in the list. In group 34 of columns, groupings (R1, R2, F1, F2, L1 and L2, as noted relative to FIG. 4), according to segment are indicated for each of the customers.

FIG. 7 is a diagram of a chart 40 that reveals a sample ranking with a larger group of customers than the sample ranking in charts 18 and 30 of FIGS. 5 and 6, respectively. Column 41 may be an identification or row number for each cell of customers. Column 42 may be a cell description in terms of an RFL ranking that can provide a prediction of the customer being selected to participate in a DR event, for example, in a load shed, based on various operator selectable criteria. In column 43 may be an indication of a number of customers in the respective cells. Column 44 may indicate a number of new customers in each of the cells. Column 45 may indicate a total number of DR events in 24 weeks for each cell. Recency in terms of a number of days may be indicated for the respective cells in column 46. Frequency in terms of DR events per week may be indicated in column 47 for each cell. Load per DR event may be indicated in column 48 for the respective cell. Load for each event per week may be indicated in column 49 for a cell. Column 50 may indicate a 24 week total of load for each cell. Column 51 may indicate a percentage of the total number of customers (i.e., 10,000) that each cell has. Column 52 may indicate a percentage of new customers in each cell of the total for all cells. Column 53 may indicate for each cell a percentage of DR events of the total number of DR events, and column 54 may indicate a percentage of a load for each cell of the total load of all cells.

Columns 43-50 may have alternative labels, respectively, of (a), (b), (c), (d), (e), (f), (g) and (h). A calculation for column 48 (f) may be (f)=(h)/(c). A calculation for column 47 (e) may be (e)=(c)/(a)/(m). (m) may be a designated period of 24 weeks in symbol 55. An operator may change a confidence level and time period to see the data change and change the levels of likely participation.

Figure 8:
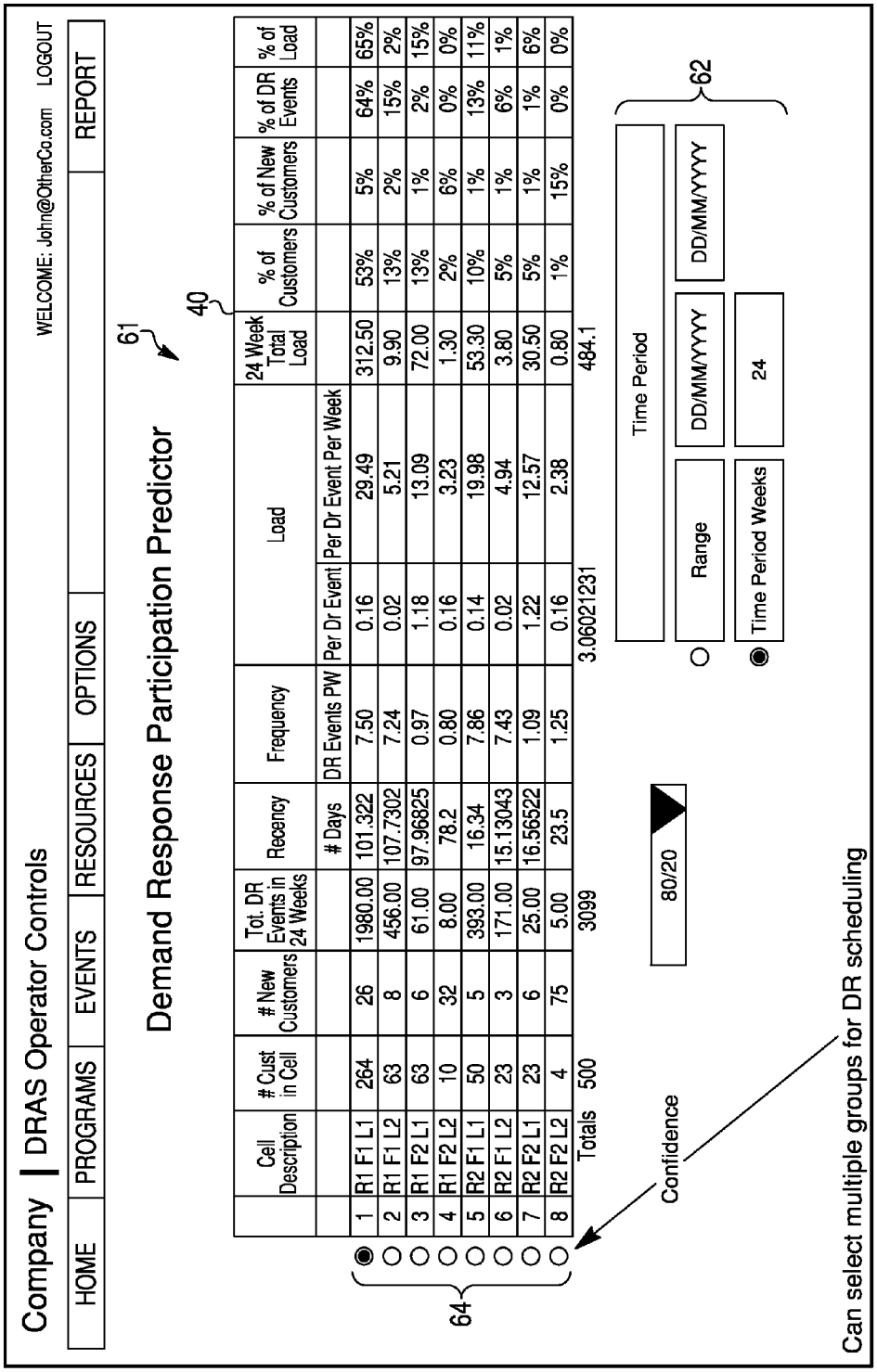
FIG. 8 is a diagram of a screen shot that contains a chart of FIG. 7 placed in a set of a demand response participation predictor for a company.

FIG. 8 is a diagram of a screen shot that contains table or chart 40 of FIG. 7 placed in a set 61 for a DR participation predictor for a "Company". A time period entry may be made in blocks 62 for DR scheduling. One or more groups or cells may be selected at click points 64 for DR scheduling. There may be other conditions such as, for example, pre-conditions in that a customer is allowed only 3 opt-outs, after which the customer is permanently opted in.

FIG. 9 is a diagram of a chart 70 that appears similar to chart 40 of FIG. 7. A new category 71 may be added for those customers that are guaranteed to participate, which have a cell description 42 of no opt-out.

To recap, a demand response prediction mechanism may incorporate a processor, and a storage device connected to the processor. The storage device may incorporate a demand response (DR) program having opt-in or opt-out participation for one or more customers. The storage device may further incorporate inputted information about past behavior about the one or more customers in DR programs. A model may be constructed for each of the one or more customers based on the inputted information about the past behavior of the one or more customers in the DR programs. Prediction of participation of the one or more customers in an opt-in or opt-out DR program may be derived from respective models for the one or more customers. A utility of the DR programs may have an ability to predict participation of the one or more customers in the opt-in or opt-out DR program for a load shed.

A customer may receive credits for each instance of participation in a DR program. Each instance of participation may be an opt-in.

One or more customers may opt-in automatically or respond to an invitation to opt-in.

Each DR program may be managed by the utility. A number of credits may be determined by the utility to create an incentive for one or more customers. The credits to one or more customers may be tracked by a smart phone or web app. One or more customers may bid for credits. The utility may select the one or more customers to opt-in a DR program.

An opt-in or opt-out of a DR program may be based on a location of the smart phone or web app.

The smart phone or web app may detect a GPS position and notify a DR system that a person of the smart phone is home or away from home. The person may be asked to opt-in or opt-out to participate in a DR event. A decision to opt-in or opt-out may be manual or automatic.

A demand response predictor system may incorporate a processor; and a storage mechanism, connected to the processor, for containing data about a customer in a demand response (DR) program. A model of the customer may be developed from data in the storage mechanism, with the processor. A prediction of the customer being selected to participate in the DR program may be made from the model with the processor.

The customer may be selected to participate in a DR event. The data in the storage mechanism may incorporate information about the customer in one or more DR programs.

Recency, frequency and load may be determined from the past behavior of the customer in the one or more DR programs. The recency, frequency and load may provide a basis for developing the model of the customer, with the processor.

Recency may be a period of time since the customer last participated in a DR program. Frequency may be a number of DR events that the customer participated in during a specific amount of time. Load may be a size of an energy load of the customer.

Recency, frequency and load may be categorized into groups according to magnitudes of frequency, load, and recency.

Predicting a selection of a customer to participate in a DR event for a load shed may be based upon membership of the customer in the groups by a utility operator.

An approach for predicting a customer's participation in a demand response program, may incorporate providing a processor, collecting information about past behavior of a customer in a demand response (DR) program, developing a model of the customer from the information with the processor, and predicting selection of a customer for participation in a DR program, with the processor, based on the model.

The approach may further incorporate predicting for a utility operator participation of one or more customers based on the model, in a DR event for a load shed.

The approach may further incorporate determining recency, frequency and load from the information about past behavior of the customer in a DR program, and developing the model of the customer from recency, frequency and load.

Recency may be a period of time since the customer last participated in a DR program. Frequency may be a number of DR events that the customer participated in during a specific amount of time. Load may be a size of an energy load of the customer.

The approach may further incorporate categorizing recency, frequency and load of customers into groups according to rankings. The rankings may indicate predictability of a customer being selected relative to other customers to participate in a DR event.

The approach may further incorporate determining a number of DR opt outs left for the customer, a number of DR events participated in the past by the customer and a number of DR events that the customer has to participate in; and developing further the model of the customer with the number of DR opt outs left for the customer, the number of DR events participated in the past by the customer, and the number of DR events in that the customer has to participate.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A demand response control system for controlling a load from a utility consumed by a facility of a customer in a demand response program, the system comprising:
 a utility and/or independent service operator (ISO), comprising:
  a processor; and
  a storage mechanism, connected to the processor, for containing data about a customer in a demand response (DR) program; and
 wherein:
 a model of each customer in a demand response program is developed from data in the storage mechanism, with the processor, wherein the data includes values associated with the customer for a plurality of factors; and
 a ranking of each customer is developed relative to other customers for each factor of two or more factors of the plurality of factors;
 intersection groups are developed by grouping customers with the same rankings in each factor of the two or more factors; and
 a table having rows and columns is developed with the intersection groups either the rows or columns and each factor of the two or more factors in the other of the rows or columns, wherein each cell at a cross-section of an intersection group and a factor is a value indicating a magnitude value of the intersection group for that factor;
 one or more intersection groups are selected from the table to meet an objective of a DR event of the DR program and control signals are sent from the utility and/or independent service operator (ISO) to each facility of each customer in the selected one or more intersection groups to affect a load on the utility in response to the DR event and maintain a balance of supply from the utility and demand on the utility
 the two or more factors include recency, frequency, and load;
 each customer is ranked relative to other customers for each of recency, frequency, and load; and
 each customer is categorized into an intersection group according to the customer's ranking for frequency, load, and recency.

2. The system of claim 1, wherein:
 values for recency, frequency, and load are determined from the past behavior of the customer in the one or more DR programs.

3. The system of claim 2, wherein:
 recency is a period of time since the customer last participated in a DR program;
 frequency is a number of DR events that the customer participated in during a specific amount of time; and
 load is a size of an energy load of the customer.

4. A method for controlling a load from a utility consumed by a facility of a customer in a demand response program that maintains a balance of supply from the utility and demand on the utility, comprising:
  providing a processor;
  collecting information about past behavior of a plurality of customers in a demand response (DR) program, wherein the collected information includes values for a plurality of factors;
  developing a model of each of the customers of the plurality of customers from the information with the processor;
  developing a ranking of each of the customers of the plurality of customers relative to other customers for each factor of two or more factors of the plurality of factors;
  developing intersection groups by grouping customers with the same rankings in each factor of the two or more factors into an intersection group; and
  developing a table having rows and columns with the intersection groups in either the rows or columns and the factors in the other of the rows or columns, wherein each cell at a cross-section of an intersection group and a factor is a value indicating a magnitude value of the intersection group for that factor;
  selecting one or more intersection groups from the table to meet an objective of a DR event; and
  sending a control signal to each facility of each customer in the selected one or more intersection groups to affect a load by the facilities on the utility in response to the DR event and maintain a balance of supply from the utility and demand on the utility
  the two or more factors include recency, frequency, and load;
  each customer is ranked relative to other customers for each of recency, frequency, and load; and
  each customer is categorized into an intersection group according to the customer's ranking for frequency, load, and recency.

5. The method of claim 4, wherein the DR event is for a load shed.

6. The method of claim 4, further comprising:
  determining recency, frequency and load from the information about past behavior of the customer in a DR program; and
  wherein the model of the customer includes values for recency, frequency and load.

7. The method of claim 6, wherein:
  recency is a period of time since the customer last participated in a DR program;
  frequency is a number of DR events that the customer participated in during a specific amount of time; and
  load is a size of an energy load of the customer.

8. The method of claim 7, wherein the two or more factors include recency, frequency and load of customers.

* * * * *